United States Patent
Koltze

[11] Patent Number: 4,967,930
[45] Date of Patent: Nov. 6, 1990

[54] APPARATUS FOR SEPARATING INDIVIDUAL CONICAL TUBES FROM A PLURALITY OF NESTED CONICAL TUBES

[75] Inventor: Bodo Koltze, Monchen-Gladbach, Fed. Rep. of Germany

[73] Assignee: W. Schlafhorst & Co., Monchen-Gladbach, Fed. Rep. of Germany

[21] Appl. No.: 396,553

[22] Filed: Aug. 21, 1989

[30] Foreign Application Priority Data

Sep. 3, 1988 [DE] Fed. Rep. of Germany ....... 3829990

[51] Int. Cl.$^5$ .............................................. B65H 3/28
[52] U.S. Cl. ................................... 221/222; 221/210; 221/298; 414/795.6; 414/798.9
[58] Field of Search ................... 221/6, 22, 28, 210, 221/217, 220, 221, 222, 223, 224, 230, 241, 255, 257, 259, 262, 297, 298; 294/28, 29, 31.1, 31.2, 902; 414/795.6, 797.4, 797.8, 798.9

[56] References Cited

U.S. PATENT DOCUMENTS

| | | | |
|---|---|---|---|
| 3,576,275 | 4/1971 | Bookout | 221/222 X |
| 4,772,171 | 9/1988 | Mayer et al. | 414/795.6 |
| 4,854,479 | 8/1989 | Callahan et al. | 221/241 X |

FOREIGN PATENT DOCUMENTS

| | | |
|---|---|---|
| 1160365 | 12/1963 | Fed. Rep. of Germany . |
| 2131957 | 2/1973 | Fed. Rep. of Germany . |
| 2538169 | 3/1977 | Fed. Rep. of Germany . |
| 3318496 | 11/1983 | Fed. Rep. of Germany . |
| 3536818 | 4/1987 | Fed. Rep. of Germany . |
| 42377 | 2/1908 | Switzerland . |
| 663400 | 12/1987 | Switzerland . |

Primary Examiner—H. Grant Skaggs
Assistant Examiner—Dean A. Reichard
Attorney, Agent, or Firm—Shefte, Pinckney & Sawyer

[57] ABSTRACT

Conical tubes stored in a nested stack are separated one-by-one for supply to an associated textile machine or the like by a separating apparatus having two gripping ring assemblies arranged to respectively surround the last-nested and penultimate tubes of the stack, the gripping ring assemblies being arranged for relative rotation in opposite directions and relative axial movement to separate the respective tubes, each gripping ring assembly including a plurality of gripping elements pivotably movable radially into and out of peripheral gripping engagement with the respective tubes in the manner of a ratchet brake, the gripping elements being arranged to exert an increasing force of gripping engagement with the respective tubes until relative rotation thereof occurs.

10 Claims, 4 Drawing Sheets

APPARATUS FOR SEPARATING INDIVIDUAL CONICAL TUBES FROM A PLURALITY OF NESTED CONICAL TUBES

BACKGROUND OF THE INVENTION

The present invention relates to an apparatus for separating conical tubes individually one-by-one from a plurality of conical tubes nested axially with respect to one another, utilizing respective gripping mechanisms for grippingly engaging the last-nested and penultimate ones of the nested arrangement of tubes. The gripping mechanisms of the present invention are arranged for relative rotation opposite one another for loosening the last-nested and penultimate tubes and for relative axial shifting to axially separate such tubes.

As is well known, conical tubes, such as utilized for yarn winding in the textile industry, may be compactly stored in nested relation to one another, i.e. with the smaller diameter end of one conical tube inserted into the larger diameter end of another conical tube. A plurality of conical tubes nested in this manner thus form a stack or column from which individual tubes must be separated for use at a textile machine or the like, typically by drawing off the conical tube disposed at one end of the stack or column. As will be understood, an individual tube to be separated may be nested so tightly with the next adjacent tube in the column, due to the conical configuration of the tubes and the nature of their interior and exterior surfaces, that separation may be rather difficult. Likewise, nested tubes may be situated relatively loosely with respect to one another in an overall stack or column, in which case separation is easy to accomplish. Thus, the force required for separation of individual tubes from a column or stack may vary widely and unpredictably.

On the other hand, the material and design of nested conical tubes must be taken into consideration as well in relation to the force to be exerted in separating individual tubes. For example, tubes having a relatively thin wall thickness, especially disposable plastic tubes, tend to deform very readily. Likewise, with tubes fabricated of cardboard, a risk exists that the surface may be damaged if excessive force is applied to such tubes during separation.

Devices for mechanically separating nested conical tubes are known. West German Offenlegungsschrift No. 21 31 957 describes a separating device wherein tubes are separated by grippers which are cooperatively controlled by a cam to exert a superimposed rotary and axial motion on the tubes.

Such device operates with a force which is predetermined for the tube separation operation. Therefore, a danger exists that tubes which are loosely nested may be damaged because the predetermined amount of force is greater than necessary to separate such tubes while other tubes which are tightly nested may fail to be separated because the predetermined amount of force is insufficient.

SUMMARY OF THE INVENTION

It is accordingly an object of the present invention to provide an apparatus for separating individual conical tubes from a plurality of nested conical tubes wherein the gripping force required for the separation process automatically adapts to the looseness or tightness with which the tubes are nested so that the level of gripping force exerted on each individual tube is only such amount as is required to separate the tube.

Briefly summarized, the separating apparatus of the present invention includes first means for selectively gripping a last-nested one of a plurality of nested conical tubes and second means for selectively gripping the penultimate one of the tubes nested with the last-nested tube, the first and second gripping means being relatively arranged for respective rotation in opposite directions for loosening the last-nested and penultimate tubes from one another and for movement axially with respect to one another for axially separating the last-nested and penultimate tubes. Each of the gripping means includes a gripping ring for disposition annularly about the associated tube to be gripped and a respective plurality of gripping elements movably supported on the gripping ring for movement into and out of gripping engagement with the associated tube to be gripped in relation to rotation of the gripping means. The gripping elements are arranged on their respective gripping rings for increasing force of gripping engagement with the associated tube to be gripped until relative rotation occurs between the last-nested and penultimate tubes. The gripping action of the gripping elements of each gripping means is exerted in a radial direction with respect to the respective tube to be gripped thereby, the radial motion of the gripping elements acting on the last-nested tube being superimposed with an axial motion of the associated gripping ring relative to the tube in order to separate the tube axially from the penultimate tube. When the radial action of the gripping elements overcomes the adhesion between the last-nested and penultimate tubes so as to permit relative rotation thereof, the increasing gripping force exerted by the respective gripping elements automatically drops to the level of the initial contact or stressing force exerted by the gripping elements upon first engagement with the tubes. Since the last-nested and penultimate tubes are both clamped by the respective gripping means, equivalent forces are exerted on both tubes.

Advantageously, the separating apparatus of the present invention thereby applies only such radial force to the last-nested and penultimate tubes to be separated as is absolutely required for loosening the tubes from one another. In this manner, very tightly nested tubes as well as loosely nested tubes are separated in a reliable manner protecting against damage of the tubes. In the preferred embodiment, the gripping means of the apparatus operate according to the principle of a ratchet brake. A ratchet brake basically operates with respect to a body to be clamped thereby so as to permit relative movement of the body in one direction but to apply an increasing clamping force on the body upon relative movement in the opposite direction. With respect to separating conical tubes, a ratchet brake mechanism provides the particular advantage of operating in this manner to grip tubes of differing diameters. Accordingly, the separating apparatus of the present invention is adaptable for conical tubes of differing diameters without adjustment or resetting of the apparatus.

Each gripping ring includes at least one control element for common actuation of movement of the gripping elements into and out of gripping engagement with the associated tube to be gripped. Thus, the control elements enable the gripping elements to be selectively actuated into a gripping position against the associated tubes or a release position out of gripping contact with the tubes to permit removal of a separated tube and advancement of the nested stack of tubes into position for another tube-separating operation.

Advantageously, the separating apparatus may be operatively connected to a control unit associated with a textile machine which is to be supplied with separated tubes, thereby to achieve automatic operation of the separating apparatus by automatic opening and closing of the respective gripping means via their control elements.

Preferably, each gripping ring includes an annular carrier element on which the control element or elements are rotatably supported, with the gripping elements of each respective gripping ring being pivotably affixed to its carrier element for pivotal movement radially into and out of gripping engagement with the associated tube to be gripped. In order for the gripping elements of the respective gripping means to assume open or closed positions, the respective control elements of the gripping rings are actuated in opposite directions. For example, if the gripping ring of the second gripping means associated with the penultimate tube is held stationary in gripping engagement with the tube and the gripping ring of the gripping means associated with the last-nested tube is rotated, the gripping elements of the respective gripping rings automatically operate to rotate the last-nested and penultimate tubes relatively oppositely one another.

The gripping means for the last-nested tube includes stop members for limiting the range of rotational movement of the control element of the associated gripping ring, while the carrier element thereof is further rotatable relative to the control element to continue to rotate when the control element strikes a stop member. The control element is operatively connected to the gripping elements for actuation of their movement upon rotation of the carrier element when the control element is prevented from rotation by one of the stop members. During the rotation of the gripping ring for the last-nested tube into a predetermined position, the control element of the gripping ring moves the gripping elements to an opened position out of contact with the last-nested tube to enable it to be removed. Positioning of the control element of the gripping ring for the penultimate tube in an opposite disposition likewise opens its gripping elements. Since the gripping ring for the penultimate tube performs only a holding function thereon, only one control element is required for such gripping ring and the gripping ring does not need to be rotatable, relative rotation of the control element instead being actuable directly via an actuating lever. On the other hand, the gripping ring for the last-nested tube preferably includes a pair of control elements. When the gripping elements of each gripping ring are opened as described for removal of the last-nested tube, the nested stack of conical tubes may be advanced into disposition for another separating operation.

In order for another separating operation to take place after the gripping elements are opened as just described, it will be understood that the gripping ring for the last-nested tube must be rotated in a direction opposite that by which its gripping elements were previously opened. In doing so, other stop members of the gripping means for the last-nested tube are provided to engage the control elements of the gripping ring to actuate pivotal movement of the gripping elements into a closed position in peripheral gripping engagement with the last-nested tube. Preferably, the closed position of the gripping elements is selected to achieve gripping engagement of the last-nested tube in each separating operation at substantially the same location. When the control element of the gripping ring for the penultimate tube is actuated in a direction opposite to the gripping ring for the last-nested tube, e.g., via an actuating lever, the penultimate tube is likewise peripherally gripped. Advantageously, the gripping of the last-nested and penultimate tubes, the separation thereof, and the subsequent releasing of the last-nested tube may be automatically coordinated with the loading process of an associated textile machine, as aforementioned.

According to a further aspect of the present invention, the gripping ring for the penultimate tube is arranged to be adjustably setable at varying axial spacings relative to the gripping ring for the last-nested tube so that the relative positions of the gripping ring can be optimumly adjusted for accommodating tubes of differing conicities and wall thicknesses. In this manner, the present separating apparatus does not require expensive or extensive resettings of the gripping means to be operable for separating nested highly conical tubes as well as nested slightly conical tubes and tubes of differing wall thicknesses. As will be understood, the spacing to be set between the respective gripping rings will be greater for slightly conical tubes than for highly conical tubes. Another advantage of the present separating apparatus is that the gripping elements of the gripping rings are configured to automatically adapt to the outer diameter of tubes within a relatively broad range of diameters without requiring any adjustment of the positioning of the gripping rings.

BRIEF DESCRIPTION OF THE DRAWINGS

FIG. 1 is an environmental view showing the preferred embodiment of the tube separating apparatus of the present invention in axial cross-section as preferably arranged in association with a tube magazine, a transfer mechanism, and a tube conveyor for automatically supplying individual tubes to an associated textile machine or the like;

DESCRIPTION OF THE PREFERRED EMBODIMENT

Figure 1:
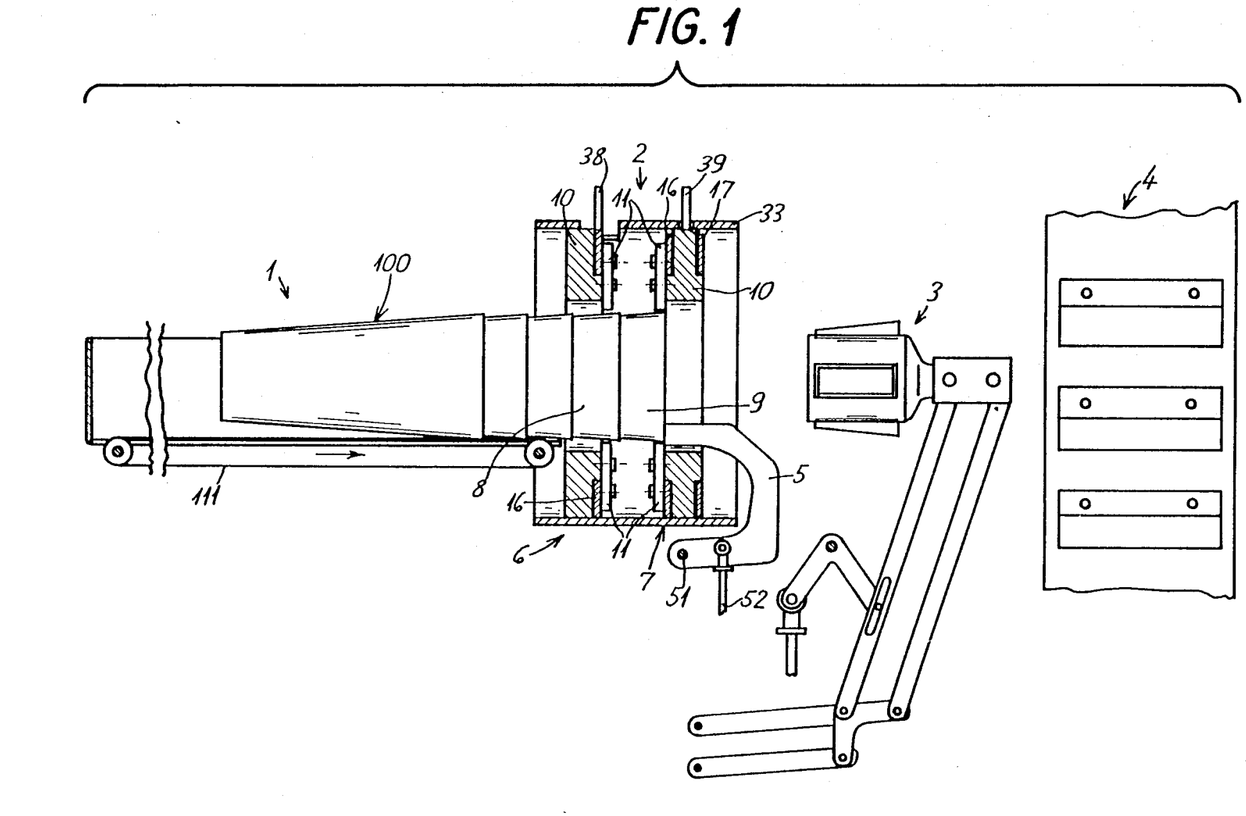

Referring now to the accompanying drawings, FIG. 1 is an overall environmental view showing the tube separating apparatus of the present invention generally at 2 perferably arranged intermediate a tube delivery magazine, generally indicated at 1, which supports a stack of nested conical tubes 100, and a tube conveyor, generally indicated at 4, such as an endless conveyor belt having individual tube-receiving pockets. The present separating apparatus 2 is operatively connected to the tube magazine 1 via a tube supply device 111, such as a conveyor belt, for advancing the nested stack of tubes 100 into the separating apparatus 2. A manipulable tube transfer mechanism, only generally indicated at 3, is arranged to be insertable into the separating apparatus 2 to grasp and withdraw individual separated tubes and place them respectively into individual pockets of the conveyor 4. The transfer mechanism 3 and the conveyor 4 do not constitute any part of the present invention and are therefore not described or illustrated in greater detail herein.

As shown in FIG. 1, the separating apparatus 2 of the present invention is arranged to receive the nested stack of conical tubes 100 as delivered in a substantially horizontal direction by the magazine 1. However, it is to be understood that the separating apparatus 2 of the present invention may also be arranged in other orientations. For example, it is contemplated that the separating apparatus 2 may be oriented to receive a nested stack of tubes delivered in a vertical direction.

The separating apparatus 2 basically includes a gripping ring assembly 6 and a gripping ring assembly 7 coaxially supported at an axial spacing from one another by a cylindrical housing 33, each of the gripping ring assemblies 6,7 being provided with a plurality of radially movable gripping elements 11 as described more fully hereinafter.

A stop member 5 is pivotably mounted about a rotational axis 51 for pivotal movement between a position extending into the separating apparatus 2 to act as a positioning stop for advancement of the nested stack of conical tubes 100 into the separating apparatus 2 and another position fully withdrawn from the separating apparatus 2 permitting a separated tube to be withdrawn.

In basic operation, as more fully explained hereinafter, the nested stack of tubes 100 is advanced by the conveyor 111 of the magazine 1 axially into the separating device 2 until the leading end of the last-nested tube 9 engages the stop member 5, wherein the last-nested tube 9 is disposed for gripping engagement by the gripping ring assembly 7 and the penultimate tube 8 is disposed for gripping engagement by the gripping ring assembly 6. Thereupon, the gripping ring assembly 6 is operated to engage its gripping elements 11 peripherally with the exposed foot end portion of the penultimate tube 8, thereby also centering the nested stack of tubes. The gripping ring assembly 7 is then operated to engage its gripping elements 11 with the exposed foot end portion of the last-nested tube 9. The stop member 5 is pivoted out of the separating apparatus 2 and the gripping ring assembly 7 performs a helical motion to rotate the last-nested tube 9 and separate it axially from the penultimate tube 8. The separated last-nested tube 9 is released by the gripping ring assembly 7 and removed from the separating apparatus 2 by the transfer mechanism 3, which places the tube 9 on the conveyor 4 for delivery to the associated textile machine.

Figure 2A:
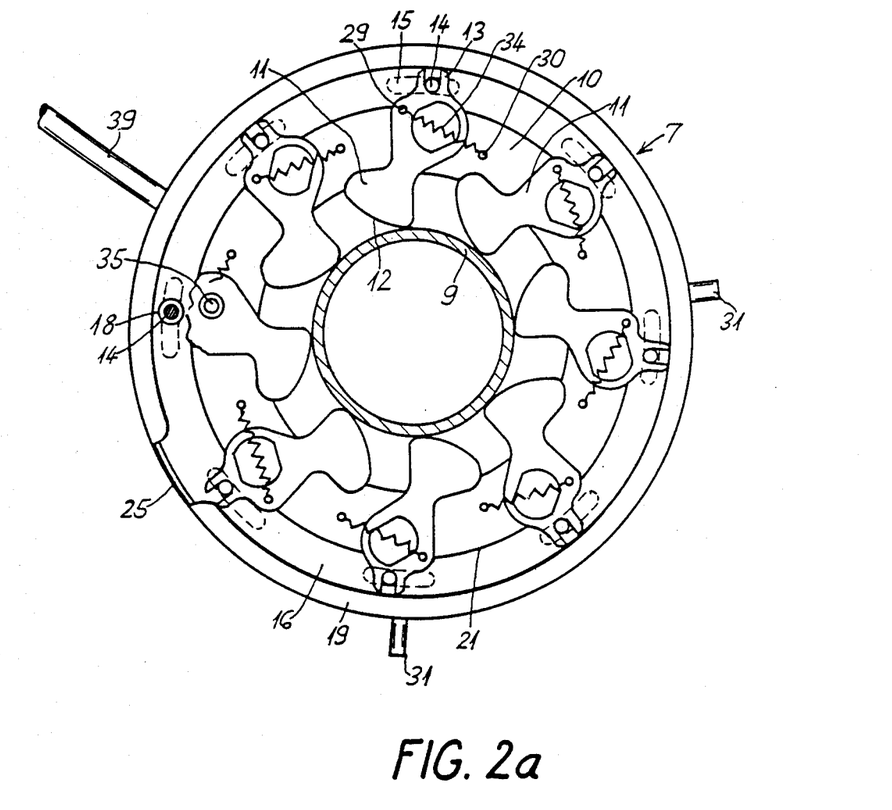
FIG. 2a is a detailed elevational view of the gripping ring associated with the last-nested tube, from the radial face thereof at which the gripping elements are located.
Figure 2B:
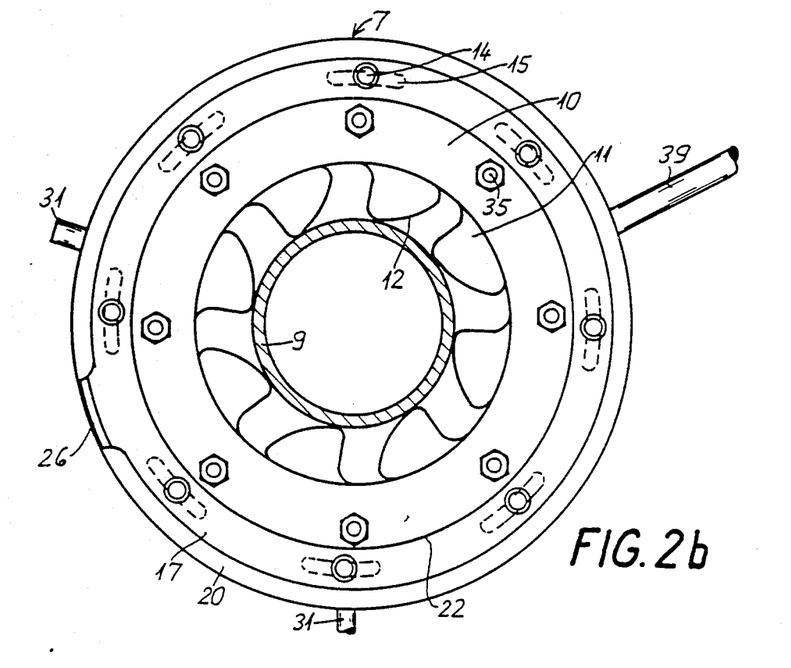
FIG. 2b is another elevational view of the gripping ring of FIG. 2a showing the opposite radial face thereof.

FIGS. 2a and 2b show the construction gripping ring assembly 7 for the last-nested tube 9 in greater detail, the construction of the gripping ring assembly 6 for the penultimate tube 8 being comparable to that of the gripping ring assembly 7. In FIG. 2a, the gripping ring assembly 7 is shown in axial elevation from the radial face at which the gripping elements 11 are attached, while FIG. 2b shows the opposite radial face of the gripping ring assembly 7 in axial elevation.

The gripping ring assembly 7 includes an annular carrier element 10 to which eight gripping elements 11 are pivotably mounted by bolts 35 at equal circumferential spacings. The bolts 35 extend parallel to the longitudinal axis of the annular carrier element 10 to also extend parallel to the longitudinal axis of the last-nested tube 9 gripped thereby for pivotal movement of the gripping elements 11 in radially inward and outward directions. As aforementioned and as more fully explained hereinafter, the actuation of the gripping elements 11 is controlled in the fashion of a ratchet brake. The inwardly extending end 12 of each gripping element 11 forms a brake surface for gripping engagement with the last-nested tube 9 and is contoured to move upon clamping rotation of the gripping elements 11 about their respective axes in the same direction as the last-nested tube 9 is caused to rotate.

The contour of the gripping surface 12 of the gripping elements 11 is also selected to achieve a clamping or locking action on the tube even if the spacing between the rotational axis 35 of the gripping elements 11 and the outer periphery of the tube varies, such as would result with tubes of differing conicities or wall thicknesses. It is a prerequisite for unobjectionable operation of a ratchet brake that it exerts a slight force against the surface of an object to be clamped or locked thereby.

As a result of the geometry of a ratchet brake mechanism and the frictional forces existing between its engagement surfaces and an object to be clamped, the brake elements of a ratchet brake mechanism must be arranged to pivot in the direction of locking engagement, i.e., in the direction in which the object to be clamped is moved. However, since the spacing of the clamping surface, i.e. the end 12 of the gripping elements 11, from the axis of rotation thereof constantly increases, the force with which the ratchet brake is clamped against the object also increases. In the present invention, the gripping end 12 of each gripping element 11 contacts the object to be clamped, i.e. the last-nested tube 9, at one peripheral point thereon. As will be understood, the provision of several ratchet brake elements arranged annularly around a cylindrical body to be clamped and the connection of the ratchet brake elements to one another for synchronous pivotal movement causes the body to be uniformly gripped by the ratchet brake elements for locking against rotary motion in the direction of pivoting of the ratchet brake elements.

In the present invention, the outward contoured end 12 of each gripping element 11 may be formed with a transversely crowned edge which enables the gripping elements 11 to securely grasp conical tubes of varying conicities without subjecting the tubes to potential damage by a relatively sharpened edge of the gripping elements 11. The surface of the contoured end 12 of the gripping elements 11 may be roughened to achieve optimal clamping engagement with the tubes.

Each gripping element 11 includes a forked portion 13 at the end of the gripping element 11 opposite the contoured end 12. The forked portion 13 of each gripping element 11 surrounds a pin 14 which extends through an annularly elongated slot 15 milled in the annular carrier element 10. The opposite radial faces of the carrier element 10 are respectively profiled with concentric guide surfaces 19,20 forming respective shoulders 21,22. Annular control elements 16,17 are rotatably supported by the carrier element 10 at the respective guide surfaces 19,20 in abutment with the shoulders 21,22. The pins 14 are affixed to the control element 17 at one radial face of the carrier element 10 and extend respectively through the elongated slots 15 in the carrier element 10 and outwardly therefrom through respective bores 18 in the other control element 16 at the opposite radial face of the carrier element 10. In this manner, the pins 14 connect the control elements 16,17 to one another in an essentially unitary or integral manner. As a result, the control elements 16,17 always rotate in synchronism with one another regardless of whether the moment of force producing the rotation is applied to the control element 16 or the control element 17. Each pin 14 extends sufficiently outwardly beyond the control element 16 to act on the forked portion 13 of the associated gripping element 11 to effect radially inward and outward opening and closing pivotal movement of the gripping element 11. The position and length of the elongated slots 15 in the carrier element 10 determines the range of available pivoting movement of the gripping elements 11. Thus, the control elements 16,17 achieve a unitary association of the eight gripping elements 11 to assure synchronous movement thereof. In order to actuate the control elements 16,17, the outer periphery of the control element 16 is provided with an axially extending tongue 25 and, similarly, the outer periphery of the control element 17 is provided with an axially extending tongue 26 and respective stop members 27,28 are affixed to the radially inward surface of the cylindrical housing 33 to abut the tongues 25,26 for limiting their range of rotational movement, as more fully described hereinafter.

Figure 3:
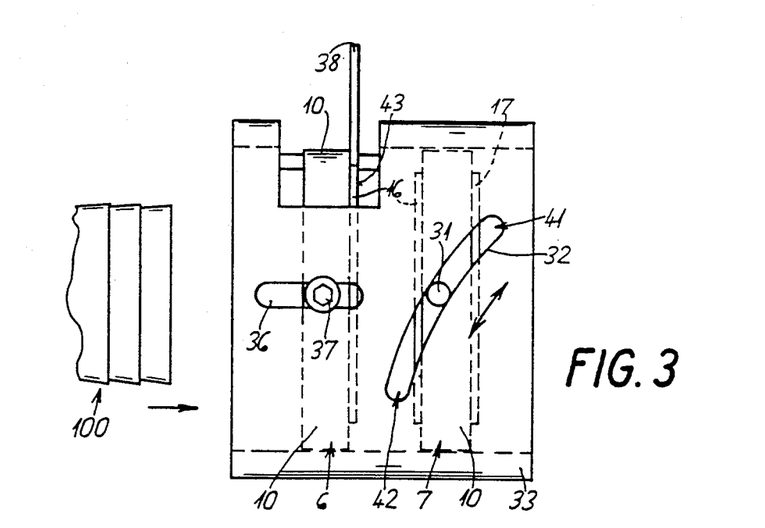
FIG. 3 is a side elevational view of the separating apparatus of the present invention.
Figure 5A:
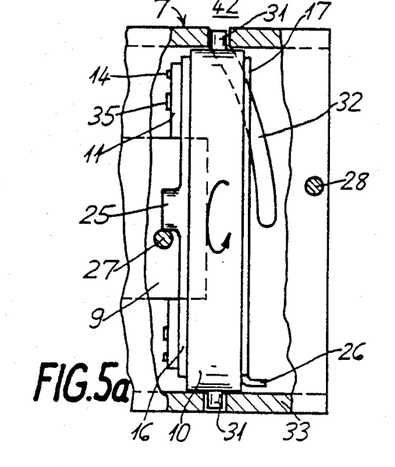
FIG. 5a is a view, partially in side elevation and partially in vertical cross-section, of the gripping ring for the last-nested tube, with the gripping elements in closed position.
Figure 5B:
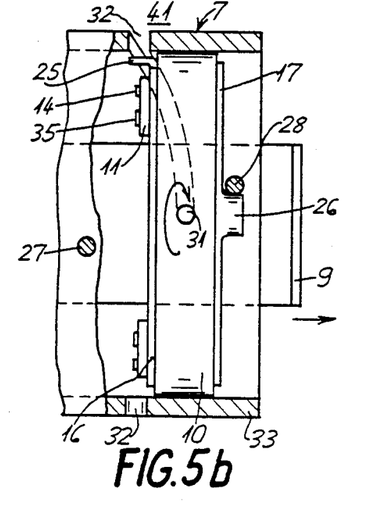
FIG. 5b is a view similar to FIG. 5a showing the gripping ring thereof with its gripping elements in their open position.

The gripping ring assembly 7 also includes guide pins 31 which extend radially outwardly from the outer periphery of the carrier element 10 and are received in respective helically extending guide slots 32 formed in the cylindrical housing 33 for defining the available range of rotational and axial movement of the gripping ring assembly 7, as best seen in FIGS. 3,5a and 5b. An actuation lever 39 similarly extends radially outwardly from the periphery of the carrier element 10 of the gripping ring assembly 7 through a similar guide slot (not shown) in the cylindrical housing 33 for actuating guided movement of the gripping ring assembly 7. The actuation lever 39 may be operatively connected to a control unit of the associated textile machine or to another activation device (not shown) for automatic actuation of the gripping ring assembly 7 to perform a tube separation operation, as previously indicated.

FIG. 3 schematically illustrates the arrangement of the gripping ring assemblies 6,7 within the cylindrical housing 33 of the present separating apparatus 2. As will be understood, when the guide pins 31 are moved within their guide grooves 32 into the position 41 at one end of the guide slots 32, the tongue 26 of the control element 17 strikes the stop member 28 to cause the control element 17 to pivot the gripping elements 11 radially outwardly into an open position, shown in FIG. 5b. On the other hand, when the guide pins 31 are moved to the opposite ends of their guide slots 32 into the position 42, the tongue 25 of the control element 16 strikes the stop member 27 to cause the control element 16 to actuate radially inward pivoting of the gripping elements 11 into peripheral gripping engagement with the foot end portion of the last-nested tube 9 to be separated, as shown in FIG. 5a.

As aforementioned, the gripping ring assembly 6 is of a comparable construction to the gripping ring assembly 7, but the carrier element 10 of the gripping ring assembly 6 is mounted within the cylindrical housing 33 in a non-rotatable manner and is movable relative to the cylindrical housing 33 only in an axial direction. Specifically, a retaining screw 37 extends through an axially elongated slot 36 within the cylindrical housing 33 into retaining engagement with the carrier element 10 of the gripping ring assembly 6 to hold the gripping ring assembly 6 against rotational movement. The retaining screw 37 may be loosened to permit adjustable axial shifting of the gripping ring assembly 6 within the longitudinal extent of the slot 36. In this manner, the gripping ring assembly 6 may be set at various axial spacings from the gripping ring assembly 7 to accommodate nested tubes of differing conicities and wall thickness. Since the carrier element 10 of the gripping ring assembly 6 is retained in a stationary position, the gripping ring assembly 6 requires only one control element 16, rotation of which relative to the carrier member 10 is actuated by an actuation lever 38 extending outwardly from the control element 16 through a recess 43 in the cylindrical housing 33. As with the actuation lever 39, the actuation lever 38 may also be operatively connected to a control unit for automatic operation of the gripping ring assemblies 6, 7 to automatically perform a tube separation operation.

Figure 4A:
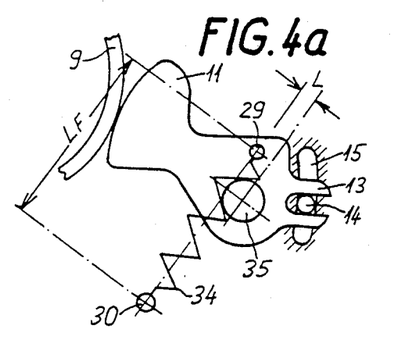
FIGS. 4a, 4b, and 4c show one gripping element of one of the gripping rings of the separating apparatus in a gripping position, a fully open position, and a fully closed position, respectively.
Figure 4B:
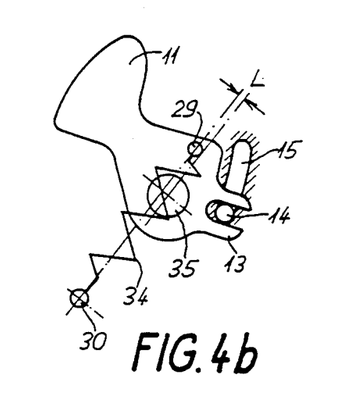
Figure 4C:
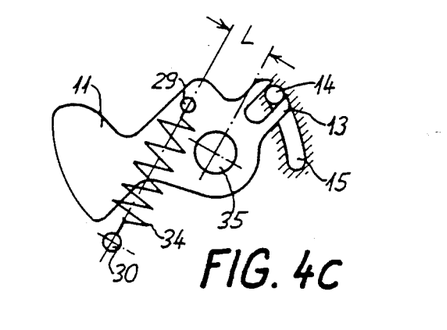

FIGS. 4a, 4b and 4c illustrate one of the gripping elements 11 of one of the control ring assemblies 6, 7 in three differing dispositions for performing a separation operation. Each gripping element 11 is biased by a spring 34 extending between a supporting pin 29 on the gripping element 11 and a supporting pin 30 affixed to the carrier element 10. As will be described, the spring 34 urges its gripping element 11 into peripheral contact with a conical tube, such as indicated by tube 9 in FIG. 4a, with a slight initial stressing force against the tube 9. The disposition of the supporting pins 29, 30 for each spring 34 is selected relative to the rotational axis 35 of the gripping element 11 to cause several actions to occur in the operation of the gripping ring assembly 7 during a tube separation process.

One such action occurs in actuating the gripping ring assembly 7 into gripping engagement with a last-nested tube 9. As aforementioned, the control element 16 includes a tongue 25 for striking a stop member 27 on the inner periphery of the cylindrical housing 33 during rotational movement of the gripping ring assembly 7 into its position 42 in order to actuate the control element 16 to initiate the tube gripping process, as shown in FIG. 5a. Engagement of the tongue 25 with the stop member 27 thereby prevents the control element 16 from further rotation with the gripping ring assembly 7. However, as will be understood, the carrier element 10 is permitted to continue rotation with the gripping ring assembly 7 into the position 42, whereby relative motion occurs between the carrier element 10 and the control element 16 which operates to pivot the gripping elements 11 radially inwardly.

Since the control element 17 is integrally connected with the control element 16 by the pins 14, the control element 17 follows the motion of the control element 16. As a result, the gripping elements 11 are moved into a first position as shown in FIG. 4a wherein each gripping element 11 is pivoted into a position in which a lever arm L, i.e. the spacing between the rotational axis 35 of the gripping element 11 and the longitudinal center line of its associated spring 34, is relatively increased. In such disposition, the moment on the gripping element 11 exerted by the tensioning force of the associated spring 34 exceeds the frictional forces between the gripping element 11 and its axial supporting bolt 35 and between the control elements 16, 17 and the carrier element 10, whereby this disposition of the gripping element 11 is relatively labile. Accordingly, the tensioning force of the spring 34 acts on the gripping element 11 to pivot it further radially inwardly, thereby increasing the lever arm L to allow a further contraction in the length LF of the spring 34 under the biasing force thereof.

During this action, the last-nested tube 9 to be separated is simultaneously gripped by the inwardly pivoted gripping elements 11 and centered within the gripping ring assembly 7. The gripping elements 11 rest on the outer circumferential periphery of the last-nested tube 9 in which disposition the gripping elements 11 remain until they are caused to be oppositely pivoted radially outwardly by reverse rotation of the gripping ring assembly 7.

The release of the gripped tubes after a completed separation operation involves another action. When gripping ring assembly 7 is rotated to move the guide pins 31 to the opposite end of their guide slots 32 into the position 41, the tongue 26 of the control element 17 strikes the stop member 28, in similar manner to the first above-described action of the gripping ring assembly, preventing further rotation of the control elements 16, 17 and, in turn, producing an opposite relative motion between the control elements 16, 17 and the carrier element 10 as the carrier element 10 continues rotation with the gripping ring assembly 7, as shown in FIG. 5b. The pins 14 cease rotation along with the control elements 16, 17 and thereby cause the gripping elements 11 to be pivoted radially outwardly into a second position thereof such as shown in FIG. 4b. The last-nested tube 9 is thereby released and can be withdrawn axially from the penultimate tube, as indicated in FIG. 5b by the directional arrow therein.

In this position of the gripping elements 11, the lever arm L, i.e. the distance between the rotational axis 35 of the gripping element 11 and the longitudinal center line of its associated spring 34, is sufficiently shortened that the moment on the gripping element 11 exerted by the tensioning force of the spring 34 is insufficient to overcome the frictional forces prevailing in the gripping ring assembly 7. Accordingly, the gripping elements 11 remain in this position of FIG. 4b until further rotational movement of the gripping ring assembly 7 into the position 42 is initiated to grip another tube.

When no tube is present in the gripping ring assembly 7, rotational movement of the gripping ring assembly 7 into its position 42 causes the gripping elements 11 to be fully pivoted radially inwardly into a third position shown in FIG. 4c. In such position, the pin 14 associated with each gripping element 11 is seated at one end of the associated elongated slot 15 in the carrier element 10, thereby limiting further inward pivoting of the gripping elements 11. Hereagain, the gripping elements 11 remain in this position until the gripping ring assembly 7 is again rotated in the opposite direction into its opened position 41.

The operation of the separating apparatus 2 in performing a separating operation may thus be understood. Initially, the gripping elements 11 of the gripping ring assemblies 6, 7 are pivoted into their open positions. Specifically, the gripping ring assembly 7 is rotated into its position 41 of FIG. 5b via the actuating lever 39, while the control element 16 of the gripping ring assembly 6 is likewise rotated via its actuating lever 38 to pivot its gripping elements 11 into their radially outwardly pivoted open position. The nested stack of tubes 100 is then advanced axially into the cylindrical housing 33 of the separating apparatus 2 by the conveyor belt 111 or another suitable advancing mechanism until the leading tube in the stack, i.e. the last-nested tube 9, strikes the stop member 5 with the foot end portion of the tube 9. The actuation lever 38 of the gripping ring assembly 6 is then actuated via the aforementioned control unit (not shown) in the opposite direction to rotate its control element 16 to actuate radially inward pivoting movement of its gripping elements 11 into peripheral gripping engagement with the penultimate tube 8 to clampingly engage and center the tube 8 within the gripping ring assembly 6. Thereafter, the stop member 5 is pivoted out of the cylindrical housing 33 to remove the stop member 5 as an obstacle to withdrawal of the last-nested tube 9 to be separated. At the same time, the gripping ring assembly 7 is rotated via its actuating lever 39 into the position 42 of FIG. 5a, during which the tongue 25 of the control element 16 strikes the stop member 27 to actuate radially inward pivoting movement of the gripping elements 11 into the position shown in FIG. 4a as the carrier element 10 of the gripping ring assembly 7 continues rotation. Accordingly, the foot end portion of the last-nested tube 9 is securely gripped by the gripping elements 11 of the gripping ring assembly 7.

At this point, the gripping elements 11 of the respective gripping ring assemblies 6, 7 are engaged peripherally with, and exert an initial level of stressing force on, the last-nested tube 9 and the penultimate tube 8. Next, the gripping ring assembly 7 is rotated in the opposite direction by its actuating lever 39 from the position 42 into the position 41, this change of position being represented in FIGS. 5a and 5b. The gripping ring assembly 7 is thereby caused to follow a helical path of movement under the action of the guide slots 32 on the guide pins 31, whereupon the gripping ring assembly 7 moves axially away from and rotationally with respect to the stationary gripping ring assembly 6.

As aforementioned, the gripping ring assemblies 6, 7 are arranged in the cylindrical housing 33 with their gripping elements 11 positioned directly opposite one another to enable secure gripping of conical tubes which have significant conicity or wall thicknesses and therefore may be nested rather tightly with one another. Further, this arrangement enables gripping ring assemblies of the same basic construction to be utilized. As will be understood, the direction of locking actuation of the gripping ring assembly 6 is opposite to the direction of locking actuation of the gripping ring assembly 7 to automatically clamp the penultimate tube in opposition to the last-nested tube to be separated. Accordingly, the gripping ring assembly 6 applies substantially the same force and torque to the penultimate tube 8 as the gripping ring assembly 7 applies to the last-nested tube 9, but in an opposite rotational direction. The superimposed rotary and axial motions occurring during helical movement of the gripping ring assembly 7 serves to perform the separation process by drawing the last-nested tube 9 to an axially outward spacing from the penultimate tube 8.

Additionally, the gripping force required to be exerted on the last-nested tube 9 and the penultimate tube 8 to loosen them from one another is automatically regulated by the rotary motion of the gripping ring assembly 7. In the case of both gripping assemblies 6, 7, the required force is proportional to the force required to overcome the static frictional forces existing between the tubes 8 and 9.

If relatively high forces are required for loosening the tube 9 from the tube 8, the tubes 8, 9 are gripped in an appropriately firm manner to transfer the required force to the tubes. On the other hand, if the tube 9 is nested loosely within the tube 8, the initial stressing force applied by the gripping elements 11 of the gripping ring assemblies 6, 7 on the respective tubes 8, 9 will be sufficient to separate them. The gripping force exerted by the gripping ring assembly 7 and, in turn, the gripping force exerted by the gripping ring assembly 6 is increased by the geometry of the gripping elements 11 only until the tube 9 can be rotated relative to the tube 8. Once the last-nested tube 9 has been loosened from the penultimate tube 8 to be enabled to rotate with the gripping ring assembly 7, the gripping force exerted by the gripping ring assemblies 6, 7 automatically reduces to the initial stressing force originally applied by the gripping elements 11 upon initial gripping contact with the tubes.

Accordingly, as the gripping ring assembly 7 is rotated from the position 42 into the position 41, the last-nested tube 9 separates from the last-nested 8 and rotates with the gripping ring assembly 7. As shown in FIG. 5b, the tongue 26 of the control element 17 strikes the stop member 28 during this motion to limit rotational movement of the control elements 16, 17. However, since the carrier element 10 continues to rotate further with respect to the control elements 16, 17 under the motion imparted by the actuating lever 39, the action of the pins 14 connecting the control elements 16, 17 on the forked portions 13 of the gripping elements 11 causes the gripping elements 11 to be pivoted radially outwardly in a rotational direction opposite to the direction of rotation of the carrier element 10, thereby opening the gripping elements 11 to release the separated tube 9 from the gripping ring assembly 7. The separated tube 9 may then be withdrawn from the nested stack of tubes 100 by the transfer mechanism 3 and transferred to the conveyor 4, as shown in FIG. 1.

The above-described separating operation is repeated to withdraw individual tubes one-by-one from the nested stack of tubes 100. After operation of separating apparatus 2 to separate the last two remaining tubes in the stack 100, the final tube is advanced into contact with the stop member 5. However, the gripping ring assembly 6 remains in its opened disposition with its grippping elements 11 radially outwardly pivoted out of gripping engagement with the final tube so that the gripping ring assembly 7 is enabled to grip the final tube and position it to be engaged by the transfer mechanism 3 for transferal to the conveyor 4.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for separating individual conical tubes from a plurality of nested conical tubes, comprising:
    means for selectively gripping a last-nested one of said tubes, and
    means for selectively gripping the penultimate one of said tubes nested with said last-nested tube,
    said last-nested tube gripping means and said penultimate tube gripping means being relatively arranged for relative rotation in opposite directions for loosening said last-nested tube and said penultimate tube from one another and for movement axially with respect to one another for axially separating said last-nested tube and said penultimate tube,
    each said gripping means including a gripping ring for disposition annularly about the associated tube to be gripped and a respective plurality of gripping elements movably supported on said gripping ring for movement into and out of gripping engagement with the associated tube to be gripped in relation to rotation of said gripping means, said gripping elements being arranged for increasing force of gripping engagement with the associated tube to be gripped until relative rotation occurs between said last-nested tube and said penultimate tube.

2. Apparatus for separating individual conical tubes from a plurality of nested conical tubes according to claim 1 and characterized further in that each said gripping means comprises ratchet brake means for coordinating movement of said gripping elements.

3. Apparatus for separating individual conical tubes from a plurality of nested conical tubes according to claim 1 and characterized further in that each said gripping ring comprises at least one control element for common actuation of movement of said gripping elements into and out of gripping engagement with the associated tube to be gripped.

4. Apparatus for separating individual conical tubes from a plurality of nested conical tubes according to claim 3 and characterized further in that each said gripping ring includes an annular carrier element on which said control element is rotatably supported.

5. Apparatus for separating individual conical tubes from a plurality of nested conical tubes according to claim 4 and characterized further in that said gripping elements are pivotably affixed to said carrier element for pivotal movement into and out of gripping engagement with the associated tube to be gripped.

6. Apparatus for separating individual conical tubes from a plurality of nested conical tubes according to claim 5 and characterized further in that said carrier element includes a guide surface formed concentrically therewith for rotatably receiving said control element, a plurality of actuating pins are affixed at spacings to said control element, and said gripping elements are arranged at annular spacings about said carrier element with the pivot axes of said gripping elements substantially parallel to the axis of the associated tube to be gripped, each said gripping element being operatively connected to a respective one of said actuating pins.

7. Apparatus for separating individual conical tubes from a plurality of nested conical tubes according to claim 4 and characterized further in that said last-nested tube gripping means comprises stop means for limiting the range of rotational movement of said control element, said carrier element being further rotatable relative to said control element, said control element being operatively connected to said gripping elements for actuation of movement of said gripping elements upon rotation of said carrier element when said control element is prevented from rotation by said stop means.

8. Apparatus for separating individual conical tubes from a plurality of nested conical tubes according to claim 4 and characterized further in that said penultimate tube gripping means is adjustably settable at varying axial spacings relative to said last-nested tube gripping means for accommodating tubes of differing conicities and wall thicknesses.

9. Apparatus for separating individual conical tubes from a plurality of nested conical tubes according to claim 1 and characterized further in that said gripping elements have gripping surfaces contoured to be adapted to the conicity of the associated tube to be gripped.

10. Apparatus for separating individual conical tubes from a plurality of nested conical tubes according to claim 1 and characterized further in that said gripping means are oriented for horizontally receiving said plurality of nested tubes.

* * * * *